US012774831B2

(12) United States Patent
Thotakoori et al.

(10) Patent No.: US 12,774,831 B2
(45) Date of Patent: Oct. 27, 2026

(54) HOUSING ARRANGEMENT FOR REFRIGERANT COMPRESSOR

(71) Applicant: Danfoss A/S, Nordborg (DK)

(72) Inventors: Sushank Thotakoori, Tallahassee, FL (US); Marius Dragut, Tallahassee, FL (US); Lin Xiang Sun, Tallahassee, FL (US); Brandon Keith Pritchard, Tallahassee, FL (US); Wenchao Cao, Tallahassee, FL (US); Ruiguo Gao, Tallahassee, FL (US); Joshua David Flesch, Tallahassee, FL (US)

(73) Assignee: DANFOSS A/S, Nordborg (DK)

( * ) Notice: Subject to any disclaimer, the term of this patent is extended or adjusted under 35 U.S.C. 154(b) by 197 days.

(21) Appl. No.: 18/712,375

(22) PCT Filed: Jan. 31, 2023

(86) PCT No.: PCT/US2023/011943
§ 371 (c)(1),
(2) Date: May 22, 2024

(87) PCT Pub. No.: WO2023/158552
PCT Pub. Date: Aug. 24, 2023

(65) Prior Publication Data

US 2025/0012489 A1 Jan. 9, 2025

Related U.S. Application Data

(60) Provisional application No. 63/311,551, filed on Feb. 18, 2022.

(51) Int. Cl.
*F25B 31/02* (2006.01)
*F04D 25/06* (2006.01)
(Continued)

(52) U.S. Cl.
CPC ............ *F25B 31/02* (2013.01); *F04D 25/068* (2013.01); *F04D 29/023* (2013.01);
(Continued)

(58) Field of Classification Search
CPC . F25B 2400/077; H02K 5/225; F04D 29/023; F04D 29/043; F04D 29/60–604;
(Continued)

(56) References Cited

U.S. PATENT DOCUMENTS 3,790,921 A 2/1974 Nielsen et al.
5,324,589 A * 6/1994 Willard .................. B32B 27/08 428/476.3

(Continued)

FOREIGN PATENT DOCUMENTS

GB 1179169 A 1/1970
JP 2006233820 A 9/2006

OTHER PUBLICATIONS

International Search Report and Written Opinion for PCT/US2023/011943 dated May 26, 2023.

(Continued)

*Primary Examiner* — Christopher R Zerphey
(74) *Attorney, Agent, or Firm* — Carlson, Gaskey & Olds, P.C.

(57) ABSTRACT

A housing for a refrigerant compressor may include a first portion made of a metallic material and surrounding moving parts of the refrigerant compressor. The housing may further include a second portion mounted to the first portion and surrounding non-moving, electronic parts of the refrigerant compressor. The second portion is made of a plastic material.

17 Claims, 5 Drawing Sheets

(51) Int. Cl.

| | |
|---|---|
| ***F04D 29/02*** | (2006.01) |
| ***F04D 29/62*** | (2006.01) |
| ***H02K 5/22*** | (2006.01) |
| ***H02K 11/33*** | (2016.01) |

(52) U.S. Cl.

CPC ........... *F04D 29/624* (2013.01); *H02K 5/225* (2013.01); *H02K 11/33* (2016.01); *F05D 2300/10* (2013.01); *F05D 2300/43* (2013.01); *F25B 2400/077* (2013.01)

(58) Field of Classification Search

CPC ............... F04D 29/624; F05D 2300/10; F05D 2300/121; F05D 2300/171; F05D 2300/43–437

See application file for complete search history.

(56) References Cited

U.S. PATENT DOCUMENTS

| | | | | |
|---|---|---|---|---|
| 5,857,348 A * | 1/1999 | Conry | F04D 29/023 | 417/423.12 |
| 5,875,348 A | 2/1999 | Matsushima et al. | | |
| 6,679,076 B1 * | 1/2004 | Duga | H02P 1/28 | 62/228.1 |
| 7,150,604 B2 * | 12/2006 | Girod | F04B 39/12 | 417/572 |
| 7,194,871 B2 * | 3/2007 | De Bernardi | F25B 31/00 | 62/298 |
| 7,207,187 B2 * | 4/2007 | Funahashi | F04C 29/0085 | 62/505 |
| 7,640,767 B2 * | 1/2010 | Schnetzka | F25D 23/006 | 62/434 |
| 8,508,181 B2 * | 8/2013 | Broussard | H02M 7/003 | 361/623 |
| 9,624,370 B2 * | 4/2017 | Ishida | C08L 55/02 | |
| 2013/0251549 A1 | 9/2013 | Rogalski | | |
| 2014/0112804 A1 | 4/2014 | Yang et al. | | |

OTHER PUBLICATIONS

Danfoss: "Danfoss Turbocor TTH/TGH 7-12,14, Compressor", 15, May 28, 2019 (May 28, 2019), XP093351805, https://assets.danfoss.com/documents/97807/AD304757423527en-000103.pdf.

* cited by examiner

HOUSING ARRANGEMENT FOR REFRIGERANT COMPRESSOR

RELATED APPLICATIONS

This application claims the benefit of U.S. Provisional Application No. 63/311,551, filed Feb. 18, 2022, the entirety of which is herein incorporated by reference.

BACKGROUND

Refrigerant compressors are used to circulate refrigerant in a chiller via a refrigerant loop. Refrigerant loops are known to include a condenser, an expansion device, and an evaporator. The compressor compresses the fluid, which then travels to a condenser, which in turn cools and condenses the fluid. The refrigerant then goes to an expansion device, which decreases the pressure of the fluid, and to the evaporator, where the fluid is vaporized, completing a refrigeration cycle.

Many refrigerant compressors are centrifugal compressors and have an electric motor that drives at least one impeller to compress refrigerant. Fluid flows into the impeller in an axial direction, and is expelled radially from the impeller. The fluid is then directed downstream for use in the chiller system.

SUMMARY

In some aspects, the techniques described herein relate to a housing for a refrigerant compressor, including: a first portion made of a metallic material and surrounding moving parts of the refrigerant compressor; and a second portion mounted to the first portion and surrounding non-moving, electronic parts of the refrigerant compressor, wherein the second portion is made of a plastic material.

In some aspects, the techniques described herein relate to a housing, wherein the first portion is made of aluminum or steel.

In some aspects, the techniques described herein relate to a housing, wherein the second portion is made of plastic.

In some aspects, the techniques described herein relate to a housing, wherein the second portion is made of recycled plastic.

In some aspects, the techniques described herein relate to a housing, wherein the second portion is made using an injection molding or additive manufacturing process.

In some aspects, the techniques described herein relate to a housing, wherein the first portion includes a body centered about axis of rotation of the moving parts, wherein the body is substantially cylindrical.

In some aspects, the techniques described herein relate to a housing, wherein the second portion includes a frame, wherein the frame includes an arcuate contour substantially matching a contour of the body.

In some aspects, the techniques described herein relate to a housing, wherein the second portion includes first, second, and third frames, and wherein each of the first, second and third frames includes an arcuate contour substantially matching the contour of the body.

In some aspects, the techniques described herein relate to a housing, wherein the first frame is mounted to a top of the body and the second and third frames are mounted to opposing sides of the body.

In some aspects, the techniques described herein relate to a housing, wherein the first, second, and third frames directly contact the body.

In some aspects, the techniques described herein relate to a housing, wherein a variable frequency drive is mounted to the first frame.

In some aspects, the techniques described herein relate to a housing, wherein power source connections are mounted to the second frame.

In some aspects, the techniques described herein relate to a housing, wherein control electronics are mounted to the third frame.

In some aspects, the techniques described herein relate to a housing, wherein first, second, and third covers cover a respective one of the first, second, and third frames.

In some aspects, the techniques described herein relate to a housing, wherein the first, second, and third covers are made of plastic.

In some aspects, the techniques described herein relate to a housing, wherein the first, second, and third covers are received in a groove of a respective one of the first, second, and third frames.

In some aspects, the techniques described herein relate to a method, including: arranging a first portion of a housing of a refrigerant compressor such that the first portion surrounds moving parts of the refrigerant compressor, wherein the first portion is made of a metallic material; and arranging a second portion of the housing such that the second portion is mounted to the first portion and surrounds non-moving, electronic parts of the refrigerant compressor, wherein the second portion is made of a plastic material.

In some aspects, the techniques described herein relate to a method, wherein the second portion includes a first, second, and third frame, wherein the first frame is attached to a top of the first portion, and wherein the second and third frame are attached to opposing sides of the first portion.

In some aspects, the techniques described herein relate to a method, further including attaching first, second, and third covers relative to the first, second, and third frames.

In some aspects, the techniques described herein relate to a method, wherein the first, second, and third covers are made of plastic.

DETAILED DESCRIPTION

Figure 1:
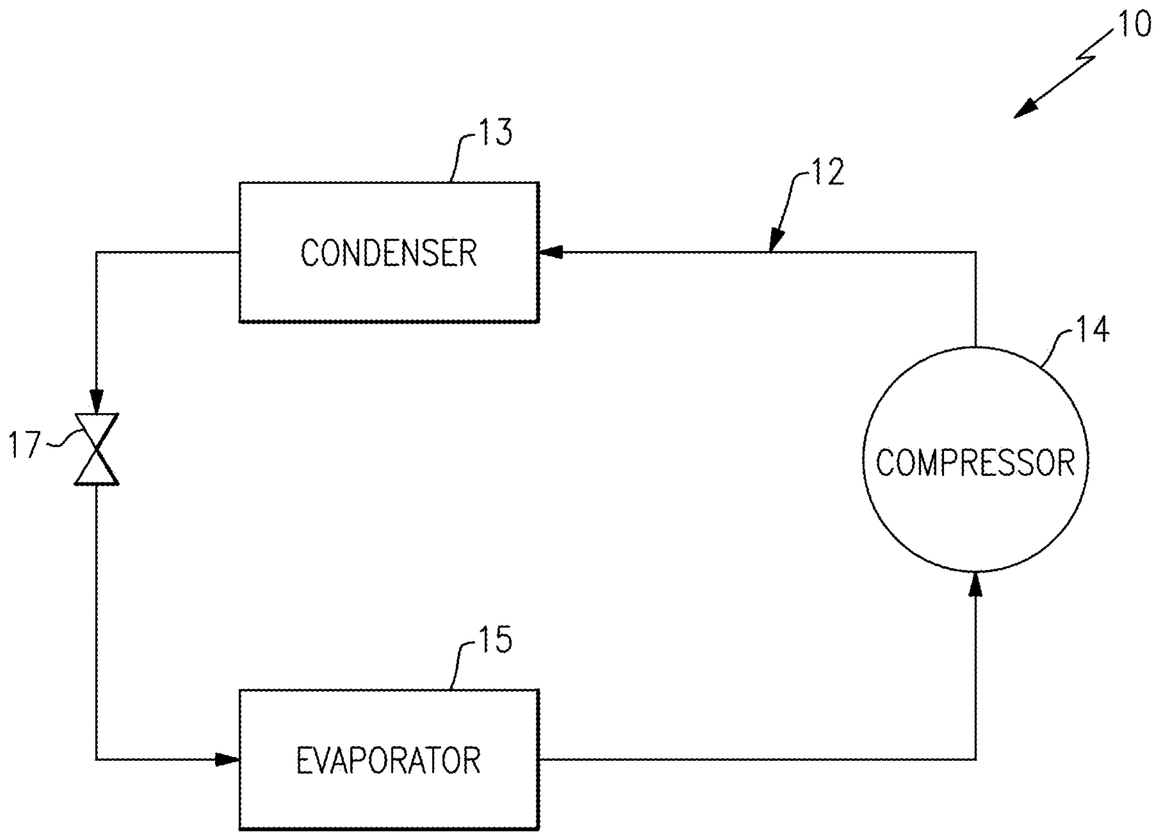
FIG. 1 schematically illustrates a refrigerant system.

FIG. 1 illustrates a refrigerant system 10. The refrigerant system 10 includes a main refrigerant loop, or circuit, 12 in communication with a compressor 14, a condenser 13, an evaporator 15, and an expansion device 17. This refrigerant system 10 may be used in a chiller, for example. In that example, a cooling tower may be in fluid communication with the condenser 13. While a particular example of the refrigerant system 10 is shown, this application extends to other refrigerant system configurations, including configurations that do not include a chiller. For instance, the main refrigerant loop 12 can include an economizer downstream of the condenser 13 and upstream of the expansion device 17.

Figure 2:
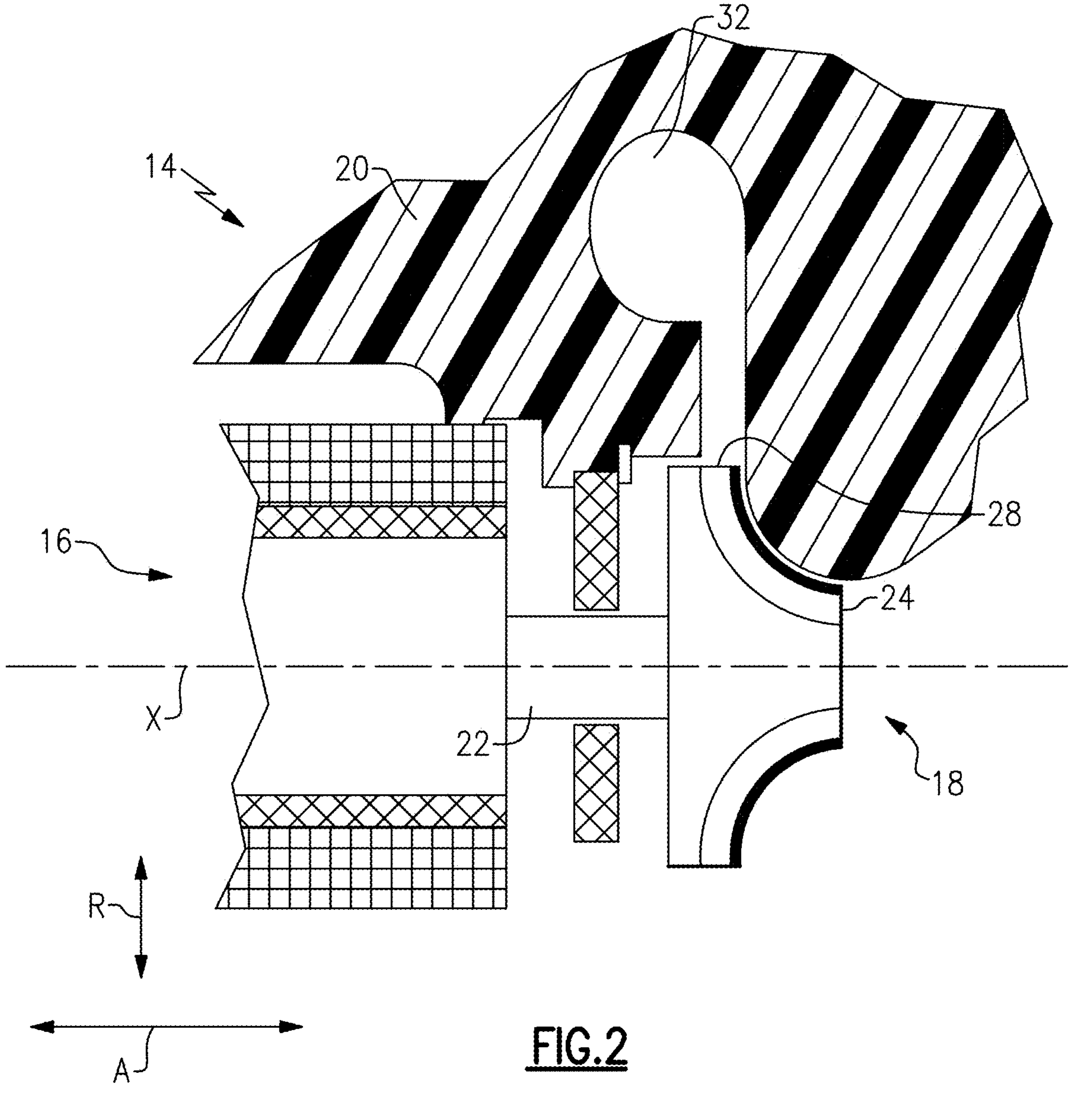
FIG. 2 schematically illustrates an example refrigerant compressor.

FIG. 2 schematically illustrates an example refrigerant compressor 14 according to this disclosure. The refrigerant compressor 14 includes a housing 20 within which an electric motor 16 is arranged. The housing 20 is schematically depicted and may comprise one or more pieces. Additional detail of the housing 20 will be discussed below. The electric motor 16 rotationally drives an impeller 18 via a rotor shaft 22 about a central axis X to compress refrigerant. The rotor shaft 22 may comprise one or more pieces. The compressor 14 is a centrifugal compressor, meaning, among other things, that the impeller 18 is configured to expel fluid in a direction away from the axis of rotation (e.g., the axis X of the shaft 22). This disclosure may extend to other types of compressors other than centrifugal compressors.

In the embodiment of FIG. 2, the impeller 18 has an outlet 28 radially outward of an inlet 24, with the outlet 28 axially spaced downstream of the inlet 24. The compressed refrigerant exits the compressor 14 via an outlet volute 32. While only a single impeller is shown in FIG. 2, this disclosure extends to compressors that include two or more impellers. While reference herein is made to a refrigerant compressor 14, this disclosure is not limited to any one particular working fluid, and extends to systems configured for other fluids such as air, water, etc.

In this disclosure, the housing 20 is a multi-piece housing. Certain portions of the housing 20 enclose the moving parts of the compressor 14, such as the electric motor 16, the impeller 18, and the rotor shaft 22, while certain other portions of the housing 20 enclose non-moving parts of the compressor 14, such as the power electronics and/or control modules of the compressor 14. In this regard, the housing 20 may be referred to as a housing assembly or simply an assembly. In this disclosure, the housing 20 includes portions made of different material types. In one specific aspect of this disclosure, the portions of the housing 20 that enclose the moving parts of the compressor 14 are made of a metallic material, such as aluminum or steel, and the portions of the housing 20 that enclose non-moving parts are made of another type of material, such as plastic. Combining metallic and plastic materials to form the housing 20 provides a number of benefits including increasing the ease of manufacturing the housing 20, increasing the ease of sealing the various parts of the compressor 14, reducing the cost of the housing 20, reducing the size of the housing 20, etc. Additionally, the plastic parts of the housing 20 can be made using recycled plastic. Further, the plastic parts of the housing 20 can be readily recycled themselves. These and other benefits will be appreciated from this disclosure.

Figure 3:
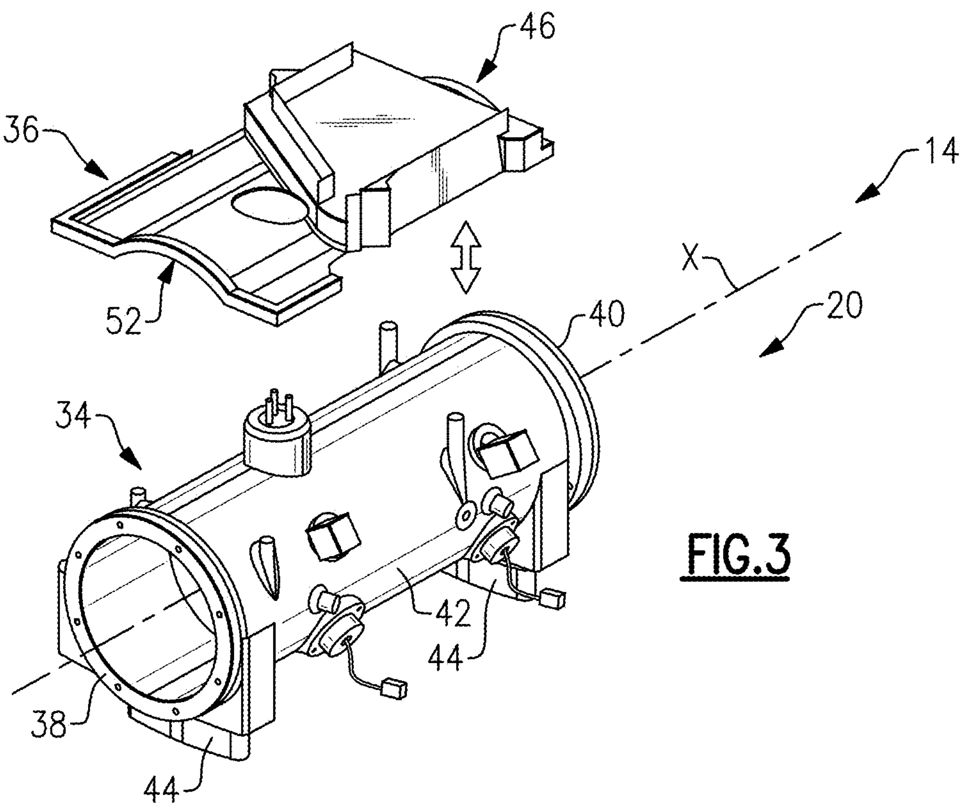
FIG. 3 is a perspective, exploded view of some portions of an example housing.
Figure 4:
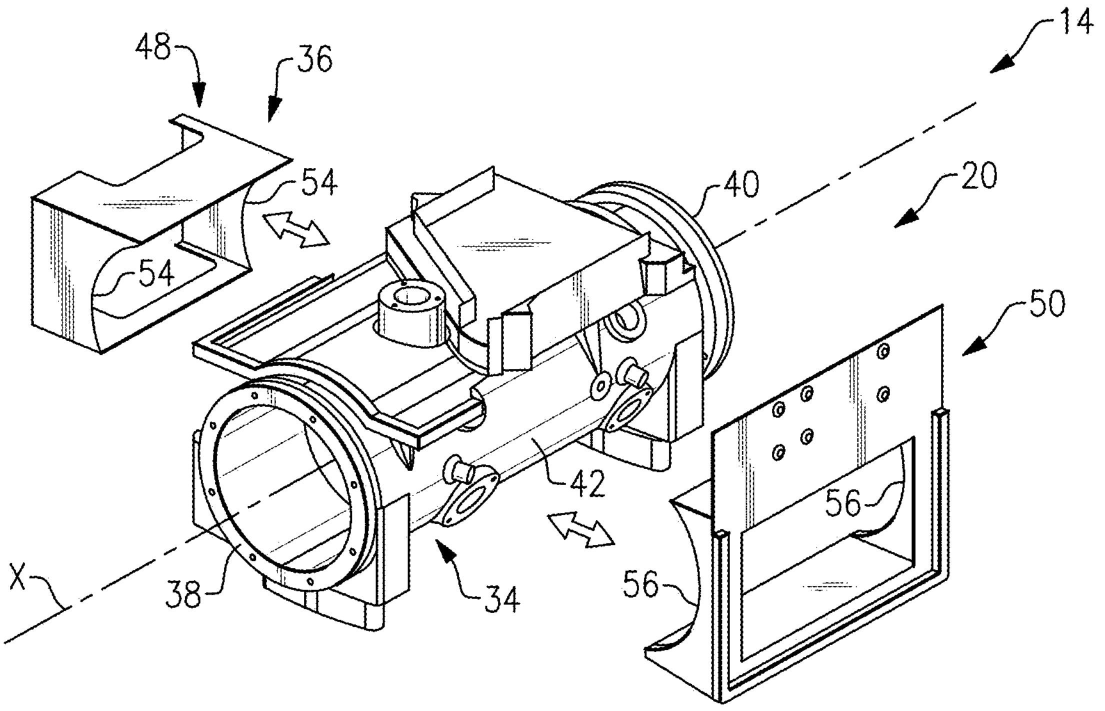
FIG. 4 is a perspective, exploded view of additional portions of the example housing.

FIGS. 3 and 4 illustrate additional detail of an example arrangement of the housing 20. The housing 20 includes a first portion 34 configured to surround the moving parts of the compressor 14 and a second portion 36 configured to be mounted to the first portion 34 and to surround non-moving parts of the compressor 14. The first portion 34 is made of a metallic material, such as steel or aluminum, and is formed by casting, in an example. Alternatively, the first portion 34 could include a steel shell. The second portion 36 is made of a plastic material is formed by injecting molding and/or additive manufacturing, as examples.

The first portion 34 extends along a length and the axis X between a first end 38 and a second end 40. The first portion 34 includes a cylindrical body 42 between the first and second ends 38, 40. The cylindrical body 42 is centered about the axis X. Adjacent a bottom of the cylindrical body 42, a plurality of feet 44 project downward toward a mounting surface, which may be a floor. The cylindrical body 42 includes a plurality of openings, which may be sealed, for permitting both fluid and electrical communication between various components inside the cylindrical body 42 and other components outside cylindrical body 42.

The second portion 36 includes a plurality of frames that are configured to directly contact the cylindrical body 42 and a plurality of covers that are configured to cover the frames, thereby enclosing a space for holding non-moving parts such as electronics and/or control modules. FIGS. 3 and 4 illustrate first, second, and third frames 46, 48, 50. The first frame 46 is configured to attach to a top of the cylindrical body 42, which is generally opposite the feet 44. The first frame 46 includes an arcuate contour 52 on a bottom surface thereof, which corresponds to, and substantially matches, a curve the cylindrical body 42. The second and third frames 48, 50 are configured to attach to opposite sides of the cylindrical body 42 and exhibit arcuate contours 54, 56, respectively, corresponding to the curve of the cylindrical body 42. In one example method of assembly, the first frame 46 is attached to the cylindrical body 42 using fasteners before the second and third frames 48, 50, as represented in FIG. 3. Then, as represented in FIG. 4, the second and third frames 48, 50 are added by attaching to the cylindrical body 42 and/or the first frame 46. The arcuate contours 52, 54, 56 of the first, second, and third frames 46, 48, 50 are configured to directly contact the cylindrical body 42 in one example to facilitate connection between the first and second portions 34, 36. The attachments may be made using various fasteners. While the second portion 36 includes three frames, the second portion 36 could include a different number of frames.

Figure 5:
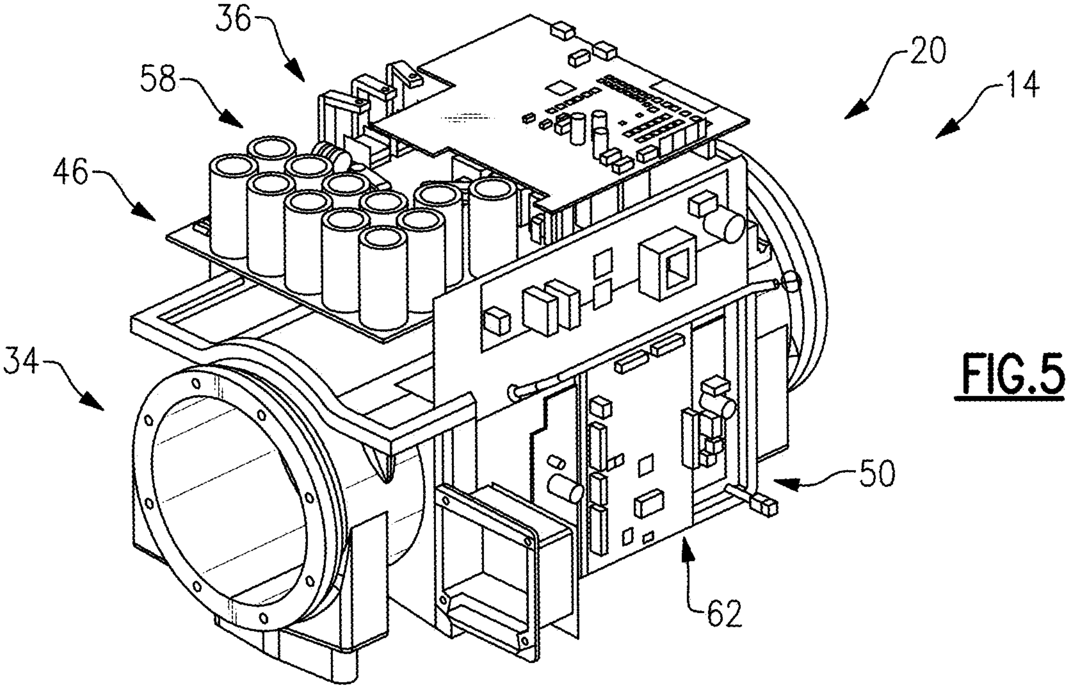
FIG. 5 is a perspective view of the example housing, with electronics mounted to frames.
Figure 6:
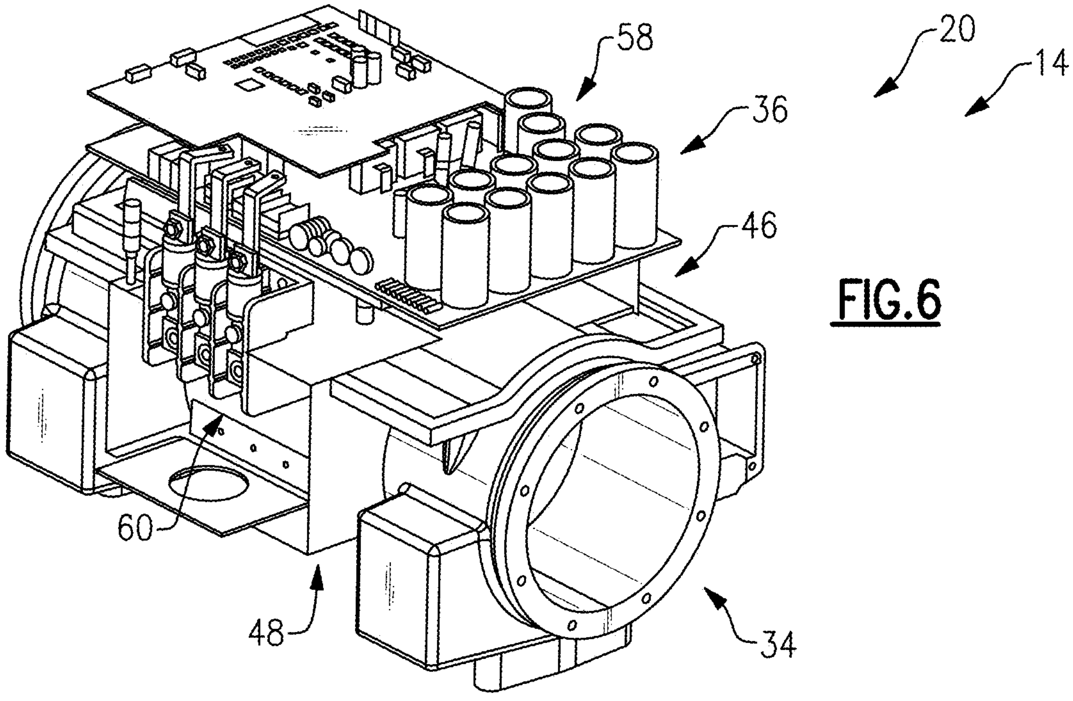
FIG. 6 is another perspective view of the example housing, with electronics mounted to frames.

FIGS. 5 and 6 illustrate the first, second, and third frames 46, 48, 50 attached to the first portion 34 and various electronic components mounted to the first, second, and third frames 46, 48, 50. In one example, a variable frequency drive (VFD) 58 is mounted to the first frame 46, power source connections 60 are mounted to the second frame 48, and control electronics 62 are mounted to the third frame 50. This arrangement is exemplary. Other controllers and/or electronics may be mounted to the first, second, and third frames 46, 48, 50.

Figure 7:
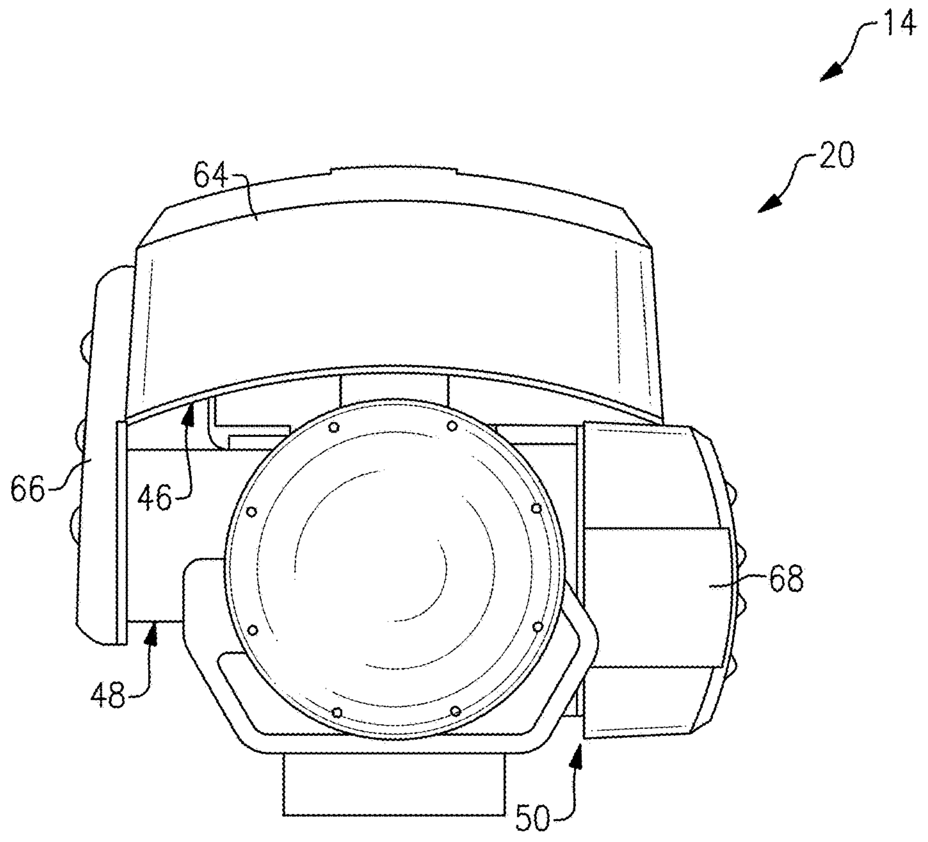
FIG. 7 is an end view of the example housing, with covers mounted to frames.
Figure 8:
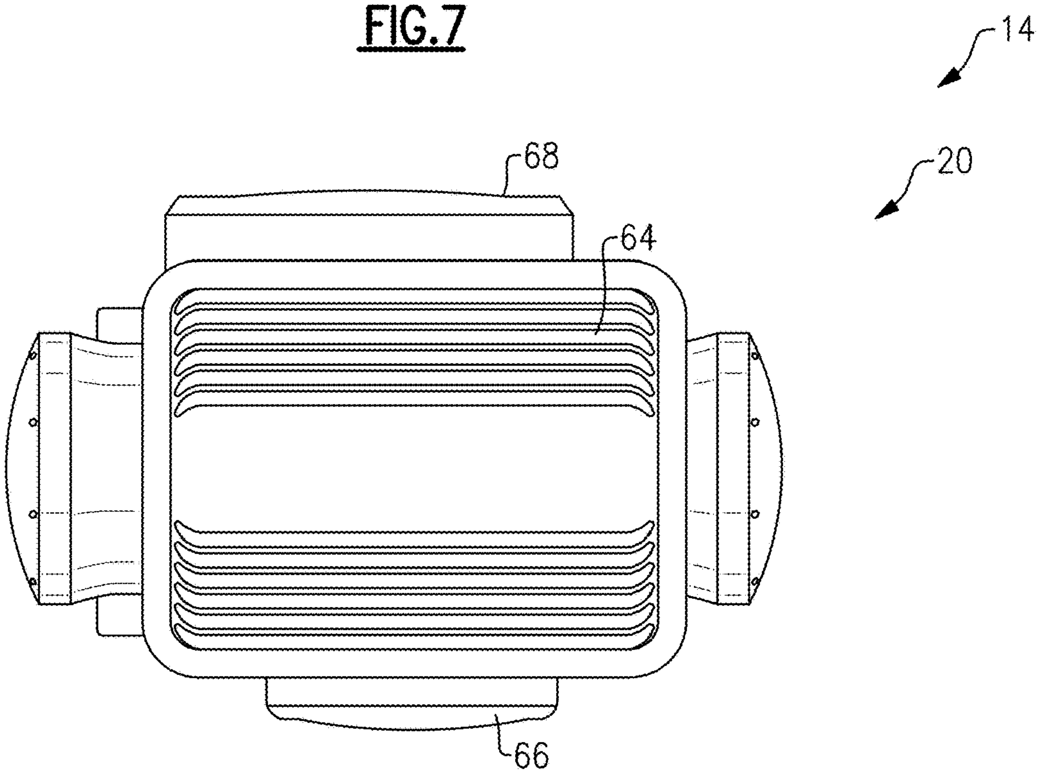
FIG. 8 is a top view of the example housing, with covers mounted to frames.

FIGS. 7 and 8 illustrate first, second, and third covers 64, 66, 68 configured to attach to the first, second, and third frames 46, 48, 50, respectively. The first, second, and third covers 64, 66, 68 are configured to fit relative to and cover a respective one of the first, second, and third frames 46, 48, 50. The first, second, and third frames 46, 48, 50 may include grooves adjacent their perimeters such that the first, second, and third covers 64, 66, 68 can be received in those grooves to provide a air and water tight fit relative to the first, second, and third frames 46, 48, 50 while enclosing a space configured to fit the various electronics shown in FIGS. 5 and 6. The first, second, and third covers 64, 66, 68 prevent the ingress of dust and water (including moisture/humidity) relative to the various electronics. This disclosure is not limited to a groove arrangement, and could extend to other air and water tight attachments between the first, second, and third covers 64, 66, 68 and the first, second, and third frames 46, 48, 50, respectively.

By forming the first, second, and third frames 46, 48, 50 and the first, second, and third covers 64, 66, 68 of plastic, the second portion 36 can be made of intricate shapes with relative ease when compared to metal. Further, the first, second, and third covers 64, 66, 68 can more readily provide an air and water tight seals relative to the first, second, and third frames 46, 48, 50 when made of plastic than if these parts were made of a metallic material.

While the second portion 36 is beneficially made of plastic, the first portion 34 is made of a metallic material, which is beneficial because it provides high strength metallic material adjacent the moving parts of the compressor 14. The first portion 34 is also relatively less complex in shape than the second portion 36, and thus the first portion 34 can be made relatively easily of metallic materials. This disclosure efficiently and strategically uses two material types of form the housing 20.

It should be understood that terms such as "axial," "radial," and "circumferential" are used above with reference to the normal operational attitude of a compressor and with reference to the central axis of the compressor. Further, these terms have been used herein for purposes of explanation, and should not be considered otherwise limiting. Terms such "generally," "about," and "substantially" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A housing for a refrigerant compressor, comprising:

a first portion made of a metallic material and surrounding moving parts of the refrigerant compressor; and a second portion mounted to the first portion and surrounding non-moving, electronic parts of the refrigerant compressor, wherein the second portion is made of a plastic material, wherein the second portion includes a frame and a cover mounted to the frame, wherein the frame includes an arcuate contour substantially matching a contour of the first portion, wherein the frame directly contacts the first portion, and wherein the frame and the cover cooperate to enclose a cavity for the non-moving, electronic parts such that the first portion does not form a boundary of the cavity, wherein the frame is a first frame and the cover is a first cover, and wherein the second portion further includes a second frame and a second cover mounted to the second frame, wherein the second frame includes an arcuate contour substantially matching the contour of the first portion, wherein the second frame directly contacts the first portion, and wherein the second frame and the second cover cooperate to enclose a second cavity for non-moving, electronic parts of the refrigerant compressor such that the first portion does not form a boundary of the second cavity, and wherein the first cover is configured to enclose the first cavity independently of the second cover and the second cover is configured to enclose the second cavity independently of the first cover.

2. The housing as recited in claim 1, wherein the first portion is made of aluminum or steel.

3. The housing as recited in claim 1, wherein the second portion is made of recycled plastic.

4. The housing as recited in claim 1, wherein the second portion is made using an injection molding or additive manufacturing process.

5. The housing as recited in claim 1, wherein the second portion further includes a third frame and a third cover mounted to the third frame, wherein the third frame includes an arcuate contour substantially matching the contour of the first portion, wherein the third frame directly contacts the first portion, and wherein the third frame and the third cover cooperate to enclose a third cavity for non-moving, electronic parts of the refrigerant compressor such that the first portion does not form a boundary of the third cavity, and wherein the third cover is configured to enclose the third cavity independently of the first and second covers.

6. The housing as recited in claim 5, wherein the first frame is mounted to a top of the first portion and the second and third frames are mounted to opposing sides of the first portion.

7. The housing as recited in claim 6, wherein the first, second, and third frames directly contact the first portion.

8. The housing as recited in claim 6, wherein a variable frequency drive is mounted to the first frame.

9. The housing as recited in claim 8, wherein power source connections are mounted to the second frame.

10. The housing as recited in claim 9, wherein control electronics are mounted to the third frame.

11. The housing as recited in claim 5 wherein the first, second, and third covers are made of plastic.

12. The housing as recited in claim 5, wherein the first, second, and third covers are received in a groove of a respective one of the first, second, and third frames.

13. The housing as recited in claim 1, wherein the frame includes a first surface facing the first portion and directly contacting the first portion, and a second surface facing away from the first portion, wherein the arcuate contour is provided on the first surface, and wherein the non-moving, electronic parts are mounted to the second surface, and wherein the first and second surfaces are non-parallel to one another.

14. The housing as recited in claim 1, wherein a first electronic module is disposed within the first cavity and a second electronic module is disposed within the second cavity, and wherein the first electronic module and the second electronic module are different types of electronic modules.

15. The housing as recited in claim 14, wherein the first electronic module is a variable frequency drive and the second electronic module includes power source connections.

16. A method, comprising:

arranging a first portion of a housing of a refrigerant compressor such that the first portion surrounds moving parts of the refrigerant compressor, wherein the first portion is made of a metallic material; and arranging a second portion of the housing such that the second portion is mounted to the first portion and surrounds non-moving, electronic parts of the refrigerant compressor, wherein the second portion is made of a plastic material, wherein the second portion includes a frame and a cover mounted to the frame, wherein the frame includes an arcuate contour substantially matching a contour of the first portion, wherein the frame directly contacts the first portion, and wherein the frame and the cover cooperate to enclose a cavity for the non-moving, electronic parts such that the first portion does not form a boundary of the cavity, wherein the frame is a first frame and the cover is a first cover, and wherein arranging the second portion further includes arranging a second frame such that the second frame directly contacts the first portion and includes an arcuate contour substantially matching the contour of the first portion, and arranging a second cover mounted to the second frame such that the second frame and the second cover enclose a second cavity for non-moving, electronic parts of the refrigerant compressor such that the first portion does not form a boundary of the second cavity, and wherein the first cover is configured to enclose the first cavity independently of the second cover and the second cover is configured to enclose the second cavity independently of the first cover.

17. The method as recited in claim 16, wherein the second portion further includes a third frame, wherein the first frame is attached to a top of the first portion, and wherein the second and third frames are attached to opposing sides of the first portion.

* * * * *